US00RE44534E

(19) United States
(12) Reissued Patent
Li et al.

(10) Patent Number: US RE44,534 E
(45) Date of Reissued Patent: Oct. 8, 2013

(54) DYNAMIC MACHINE SYNTHESIS FOR WIRELESS DEVICE ACCESS AND MANAGEMENT

(75) Inventors: Wei Li, Beijing (CN); Rong Yao Fu, Beijing (CN); Jun Shen, Melbourne (AU); Xiao Xi Liu, Beijing (CN); Song Song, Beiiing (CN)

(73) Assignee: Wistron Corporation, Taipei (TW)

(21) Appl. No.: 12/012,202

(22) Filed: Jan. 30, 2008

Related U.S. Patent Documents

Reissue of:
(64) Patent No.: 6,993,398
Issued: Jan. 31, 2006
Appl. No.: 10/358,232
Filed: Feb. 4, 2003

(30) Foreign Application Priority Data

Feb. 5, 2002 (CN) ..... 02103530 A

(51) Int. Cl.
*G06F 17/00* (2006.01)
*G06F 15/16* (2006.01)

(52) U.S. Cl.
USPC ..... 700/90; 700/4; 455/41.2; 709/226

(58) Field of Classification Search
USPC ..... 700/4, 99, 106, 904; 709/226; 455/41.2
See application file for complete search history.

(56) References Cited

U.S. PATENT DOCUMENTS 5,754,948 A * 5/1998 Metze ..... 455/41.2
5,859,878 A * 1/1999 Phillips et al. ..... 375/316
6,021,317 A * 2/2000 Irvin ..... 455/78
6,052,600 A * 4/2000 Fette et al. ..... 455/509
6,085,236 A * 7/2000 Lea ..... 709/220
6,205,362 B1 * 3/2001 Eidson ..... 700/4
6,618,764 B1 * 9/2003 Shteyn ..... 709/249
6,690,984 B1 * 2/2004 Thrift et al. ..... 700/106
6,868,447 B1 * 3/2005 Slaughter et al. ..... 709/225
6,915,142 B1 * 7/2005 Wietfeldt ..... 455/557
6,993,398 B2 * 1/2006 Li et al. ..... 700/90
2002/0027569 A1 * 3/2002 Manni et al. ..... 345/764

(Continued)

FOREIGN PATENT DOCUMENTS

JP 10-116257 * 5/1998
JP 10-320344 * 12/1998

(Continued)

OTHER PUBLICATIONS

BC894-0212 MJM G.J Mores. IBM Technical Disclosure Bulletin, vol. 38, No. 4 Apr. 1995. Configuration of a wireless-Connected Mobile Computer.*

(Continued)

*Primary Examiner* — Kidest Bahta
(74) *Attorney, Agent, or Firm* — IPXLAW Group LLP; Claude A. S. Hamrick

(57) ABSTRACT

Disclosed are techniques for effective wireless device access and management via device capability integration. A method for constructing a machine using a plurality of devices selected from a group of devices, wherein each device in the group is configurable for providing short-range wireless communication, includes the steps of: starting an application template in response to an instruction from a user; analyzing the template to determine one or more capabilities required for the machine; searching in the group for devices substantially matching at least one of the capabilities; and integrating the matching devices into the machine.

33 Claims, 5 Drawing Sheets

(56) References Cited

U.S. PATENT DOCUMENTS

| | | | | |
|---|---|---|---|---|
| 2002/0143845 | A1* | 10/2002 | Kardach | 709/102 |
| 2002/0161867 | A1* | 10/2002 | Cochran et al. | 709/221 |
| 2003/0027525 | A1* | 2/2003 | Moore et al. | 455/41 |
| 2003/0036876 | A1* | 2/2003 | Fuller et al. | 702/127 |
| 2003/0037125 | A1* | 2/2003 | Luman et al. | 709/220 |
| 2004/0024928 | A1* | 2/2004 | Billington et al. | 710/1 |
| 2004/0266348 | A1* | 12/2004 | Deshpande et al. | 455/41.2 |

FOREIGN PATENT DOCUMENTS

| | | | |
|---|---|---|---|
| JP | 2001-092757 | * | 1/2001 |
| JP | 2001-092757 | | 4/2001 |
| JP | 2001-256162 | * | 9/2001 |

OTHER PUBLICATIONS

Provisional U.S. Appl. No. 60/312,359.*

* cited by examiner

DYNAMIC MACHINE SYNTHESIS FOR WIRELESS DEVICE ACCESS AND MANAGEMENT

Matter enclosed in heavy brackets [ ] appears in the original patent but forms no part of this reissue specification; matter printed in italics indicates the additions made by reissue.

FIELD OF THE INVENTION

The present invention relates to construction of a dynamic machine (DM) for implementing effective wireless device access and management.

BACKGROUND ART

Various applications and services place more and more requirements upon pervasive devices. These often require that we use several different operating equipment, since it may be impossible for us to solve different problems with a single equipment. Different equipment, however, require different access and management approaches, so we have to learn to operate them before we can use them well. There are already well-accepted consistent and natural approaches of access and management, such as remote control and voice command, but they can only be used on certain equipment.

We have seen powerful machines like ATMs or Copiers that are composed of multiple components to perform comprehensive functions and capabilities. However, those components usually cannot be removed and reused on other machines or for other purposes. For example, the sound system of your car may never work in your house, and any ATM printer would not print a copy of a memo on your PDA. The problem is that the machines are optimized only for specific applications and that they and their components are not suitable for performing other functions. Whenever new applications come up and old machine could not help, new machines must be designed and manufactured and old machines are probably abandoned together with all components, which is but a waste of resource.

SUMMARY OF THE INVENTION

Thus, an aspect of the present invention is to provide methods and apparatus that make consistent and natural access and management methods available to all possible wireless-enabled devices.

Another aspect of the present invention is to design a method that can dynamically integrate various pervasive devices' capabilities to form dynamic machines capable of performing complex tasks originally handled by real machines only.

To reach these two aspects, the present inventors have designed an architecture and operating platform, which only have some basic requirements on devices in order for Dynamic Machine Stack (DMS) to work.

With the present invention, simple devices can be integrated into a dynamic machine (DM) by DMS so as to provide a user with integrated access and management methods, thereby providing true flexibility and convenience. Thus, complex applications or service requirements can be satisfied with a set of simple devices. Devices themselves are no longer treated as individual devices but as the constituent components of a DM.

The DMS of the present invention also provides a new approach for solving complex problems. By using dynamic machines instead of designing and manufacturing new real machines, people could just build DMs in time of need and disassemble them when ever they are no longer needed with little cost.

Bluetooth is a technology and specification for the use of short-range, wireless RF communications for both voice and data. It brings a convenient and cost-efficient way to connect various devices. Wireless devices described in the present application refer to those devices with at least one short-range RF module. Long distance RF module is not adopted in DMS because anything that can be called a machine is supposed to have a reasonable size that can be covered by short-range communications. If some devices have to perform long-distance internal communication, they are usually not regarded as a machine. There are already several short-range wireless protocols available, and Bluetooth is the preferable choice for DMS implementation.

Further advantages of the present invention include:

1) integrated device access and management methods are provided;
2) user configuration and operation are simplified when performing complex tasks that require multiple devices to work simultaneously together;
3) complex tasks can be handled with simple devices; and
4) an optimized way for resource distribution is provided.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE PRESENT INVENTION

Figure 1:
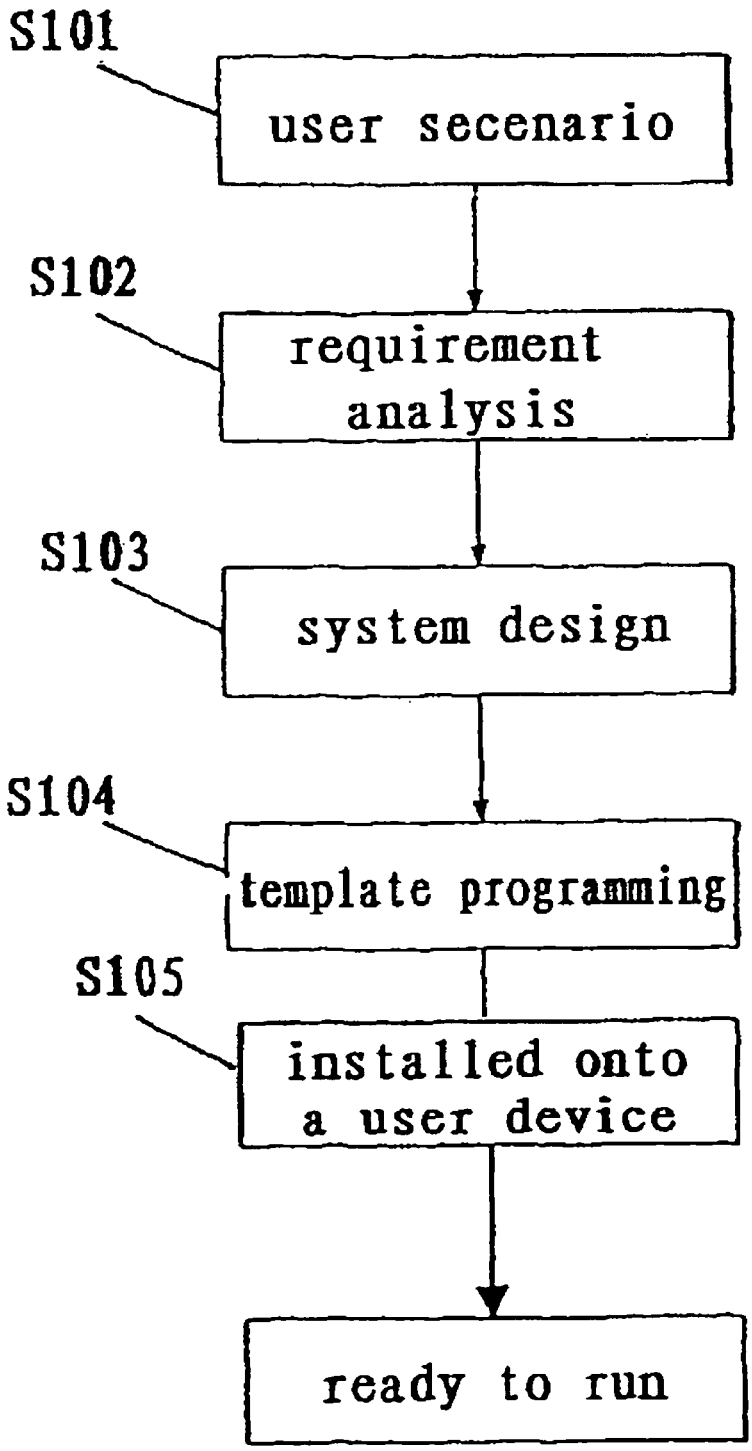
FIG. 1 shows a process of constructing a template.

The present invention provides methods and apparatus for integrating a dynamic machine for the access and management of integrated wireless devices. The method utilizes short-range wireless communication technologies to connect various devices and to integrate the functions of the devices, so as to construct DMs that can bring true convenience and flexibility to end users.

First, definitions of some basic concepts need to be made as follows:

1. Device: refers to an equipment with relatively simpler structure and functions, e.g., a lamp. A PDA is also regarded as a device because it is small and compact and provides limited functions in spite of a plurality of its components.
2. Machine: It refers to an equipment made up of multiple components that can perform complex functions. For example, a car is a machine made up of hundreds of components. Components themselves can be devices or machines. Component machines can be regarded as subsets of devices.

3. capability: refers to the functions and the scope of the functions that a device or a machine can provide. (In some other articles, this is also referred to as service. To avoid confusion, the word "capability" is chosen). For example, a monitor can display text and graphics; additionally, it may have varied resolution, color depth and refresh rate
4. property: device or machine variables that represent its internal data or status information. Properties are dynamic or runtime information of a device or machine that may change with the time.
5. method: the way a device or machine provides for a user or another device to manipulate it. For example, any device may have "On/Off" method for others to turn it on/off.
6. event: small package of intercommunication data that devices or machines send to each other. With events, devices can exchange data and command without much internal knowledge about each other.
7. service: a remote or local offering of information or data from one or more devices or machines.

Dynamic Machine Stack (DMS)

DMS is the software implementation of all required functions of a dynamic machine on a certain platform. A DMS must have the following function or service modules:

1) Bluetooth and/or Other Wireless Protocol Support

If target platform already supports modules like Bluetooth, then no extra support is generally required in DMS. However, on systems where wireless modules are optional, DMS must have necessary Bluetooth and/or other wireless protocol support.

Bluetooth and/or other wireless protocol support are necessary functions of DMS.

2) Dynamic Machine Transfer Protocol (DMTP) Processing

A higher-level protocol is required for different wireless devices to talk to each other.

DMTP refers to such protocols, which enable device data exchange independent of underlying protocols.

DMTP processing module is the module that performs actual DMTP operations to enable different devices' higher-layers talk to each other.

DMTP processing function is always required by DMS.

3) Dynamic Machine Name Service (DMNS) Processing

Components in a DM need to be given easy names for human access. And when a user issues an implicit command, the DM needs to figure out which component the user is referring to. DMNS is right for these jobs. A DMNS module would carry out actual naming or resolving actions according to characteristics of the devices or the DM , the user habits or experiences, etc. DMNS processing is an optional function of DMS.

4) Dynamic Machine Device Pool (DMDP) Processing

Assistant service is needed for managing a large amount of devices . DMDP is right to address such problems. Only systems with enough processing power need to include this module to manage and serve other devices. DMDP is an optional function of DMS.

5) Dynamic Machine Markup Language (DMML) Processing

A common language is required for various devices to describe themselves and to be understood by others. DMML language is right for this purpose. DMML module's job is for devices to store and exchange descriptions through DMTP. DMML processing is a necessary function of DMS.

6. Dynamic Machine Template Language (DMTL) Runtime

A cross-platform language is required for the authoring of DMS applications. DMTL refers to such languages. DMTL Runtime should contain necessary support functions for devices to run DMS applications, e.g., Java Runtime.

Standards are of great importance in building a workable DMS since DMS is supposed to work on widest range of devices. Major device manufactures and component developers will need to establish and follow open standards so that various products could interact without any problem. Even for non-open or specific applications, an internal standard is still required to make all parts work well together.

Any device that is to support Dynamic Machine Synthesis must have a DMS (Dynamic Machine Stack) installed. A certain component of the stack may be from a designer of the operating system or from a third party developer. It may be represented by a library, a plug-in, a program or a driver in files, RAM, ROM or built inside chip logic units. It is regarded as a DMS, no matter how each component is implemented.

DMS sits on top of wireless protocol stacks like Bluetooth and makes use of DMTP as device intercommunication protocol. Devices use DMML for self-descriptions in order to be understood by others. Applications written in DMTL define various DM functionality and behaviors to bring true convenience and flexibility to users.

Below are detailed descriptions on some DMS components.

Intercommunication Between DMTP and Device:

Protocols like Bluetooth already support voice and data communication, but not all the others. Thus, higher-level protocols are required for complex data exchange. Moreover, DMS is supposed to work across various stacks besides Bluetooth, therefore, higher-level protocols are required to enable cross-platform communication. Here DMTP refers to any one of such protocols.

A real DMTP should take into account various existing wireless protocols' characteristics, hide the underlying details and provide a standard interface to enabled complex data exchange between various platforms. It could be connection-oriented or connectionless packet switch protocol with necessary routing and fault tolerance capability. For example, if two Bluetooth devices are within a same Piconet, they can talk to each other directly. Or if the two happen to be in different Piconets, forwarding mechanism would help packets find their way to destiny. And if the two devices have different communication modules, gateways or routers would help data exchange between the two sides.

Note that under certain situations, e.g., all devices are Bluetooth-enabled and within a same Piconet, DMTP processing module seems unnecessary. However for more general implementations, DMTP is a must. Even in the simplest case, DMTP would surely enhance the reliability of communication and help ease the curve of incompatibility between different versions of a same kind of stack.

DMML and Device Description:

DMTP ensures devices to talk in a common way, but they must speak a same language before they can understand each other. DMML refers to any possible common language for device description. A real DMML could be based on XML technologies, which would make it easy for possible connections between DMS applications and XML-based services. Each DMS device should bear one or more built-in DMML pages, which describe its own capabilities, properties, events and if available, control panels, voice commands and other information necessary for device and/or human to understand the nature of the device. A DMML page from a certain device is regarded as a detailed profile of that device in a readable format. After parsing the page, further operations could be made on this device party operations.

Any DMS device should have a DMML processing module whose job is to parse DMML pages obtained from other devices and send this device's own page to others upon query through DMTP module.

Moreover, DMML pages regarding entire DM could be generated for higher-level management purpose when necessary. DMS Application may include methods for generating the pages.

DMTL and DMS Application:

A DM is supposed to provide advanced functions beyond those component devices' built-in functions. It is very difficult to build devices smart enough to understand each other's capabilities and generate enhanced functions automatically. And there could be many ways to make use of two simple devices. Thus special programs called DMS applications are required to make enhanced features available to users.

DMS applications are supposed to work across various platforms, thus a platform-independent programming language is required, referred to as DMTL. An application written in real DMTL is supposed to work on various platforms. Thus necessary support must present on each platform, which is supposed to be included in the DMTL runtime module.

Moreover, a same application is supposed to run on different sets of devices as long as they meet all requirements. So a DMS application is also called a template. Any set of objects that fit the template could run the application. A template should contain device capability requirements, necessary data and methods. The template is not determined until after the actual set of devices supported by the application has been established.

DMNS:

Other devices could identify a certain device by its address. But a user-friendly name is required for each necessary device or component. When a user issues an implicit command, it is also needed to identify the actual target device. DMNS refers to services that solve the above problems.

A real DMNS is supposed to be an application-independent service running on a dedicated public device, a machine or a user device. It should work in conjunction with devices to gain necessary information such as application and device nature, user habits or preferences as well as spatial information, so as to find proper names for devices or resolve actual device names.

A component device's name is just a temporary alias and may become invalid after the disassembling of DM. However, self-learning mechanism could be adopted in actual DMNS implementation, and that name could possibly be retained to improve service performance.

DMDP:

At public places as well as home or car environments, there might be hundreds or even thousands of devices for public access. A DMDP refers to a service that resolves the mess with effective management means.

A real DMDP service could run on a dedicated public device or machine. DMDP could work as a broker to handle device management tasks. Whenever a DMS application is started and devices with certain capabilities are requested, DMDP should help the application to find suitable ones. When the application has finished using these devices, DMDP will help resetting those devices for future use.

DMDP's job is to eliminate the overhead of finding a suitable device from among a large number of candidates so as to simplify and speed up the building of a DM and optimize communication performance.

Necessary Standards:

1) Device Capability Description

This is the basis of DMS, which and it can be gained through categorization of existing devices. For example, we can define a capability entry name as "Display" for monitors, and then under this entry, sub-entries such as "resolution", "color depth" and other necessary items. The label of each entry and the valid parameter range should be determined.

2) Device Property Description

Capabilities represent "static" information of a device, while properties reveal "dynamic" or runtime status of a device, e.g., current resolution of a monitor. Property description standard is very similar to capability standard and can be gained through similar routine.

3) Event Description

Devices interaction could be carried out through events, i.e., message packets containing command or data, for devices to exchange data or control one another. Event description standard is supposed to normalize data exchange through standardized data format and parameter range.

A complete standard covering all kinds of devices could not be easily generated. But it is possible that a same kind of devices supports a same set of events, which is regarded as a subset of the standard. A subset may get updated when necessary, and developers could look up latest version for application authoring.

Any device must follow relative DMS standards, no matter open or closed, to maintain compatibility and consistency, or DMS would never work well.

Dynamic Machine Synthesis:

1) Devices Requirements:

DMS applications require DMS enabled devices, which can be all new devices or retailored traditional ones, that they must bear required components and functions and most important, follow DMS related standards.

2) Requirement on Wireless Capability

A DMS device must come with at least one wireless module, Bluetooth, IR or others. Necessary components of DMS Stack must be installed.

3) DMS Working Mode Support

Device should support following working modes:

Stand-alone: the default mode for all the devices, that to work independently regardless of other devices;

Slave: a device operates only according to commands or data sent from other devices. Under this mode, the device works as a component in a DM. All devices should support this mode;

Master: a device operates as a coordinator of a DM , i.e., it monitors the status of multiple devices and controls their operations according to the DMS application logic. Only devices with strong processing power need to support master mode.

Required Logic Components of a Dynamic Machine:

Some logical components are required for a DM to work. Logical components are actually unions of component devices. The definitions of all these components should be included in DMS application code, and a certain application is supposed to work only on sets of devices that satisfy application definition. The actual composition of a logic component may vary from application to application. For a same application and a same set of devices, the composition may also be different each time.

CPU: just like a CPU to a PC, the CPU of a DM would control the operation of the entire devices. Any device that supports master mode could become a CPU, and a CPU may include a plurality of such devices.

Control Panel: a DM must have necessary capabilities for human-computer interaction. Control panel is supposed to combine various devices' HCI capabilities to form one integrated interface for users to access the machine.

Main Function Body: the part that accomplishes main tasks of a DM. It may include one or more devices according to application definitions and device capabilities.

Connection Point: it is the interface of a DM to other devices, machines or services. It may include multiple modules from multiple devices. A connection point is not necessary if the DM does not need to contact others.

Dynamic Device Linking (DDL):

At programming time an application author may not know exactly what devices a DM would employ at runtime. He could but define the required capabilities of component devices, and use dummy objects to finish DM logic code. It is the runtime master devices' responsibility to find matching devices and link dummy objects to real devices. And this procedure is called dynamic device linking.

Figure 2A:
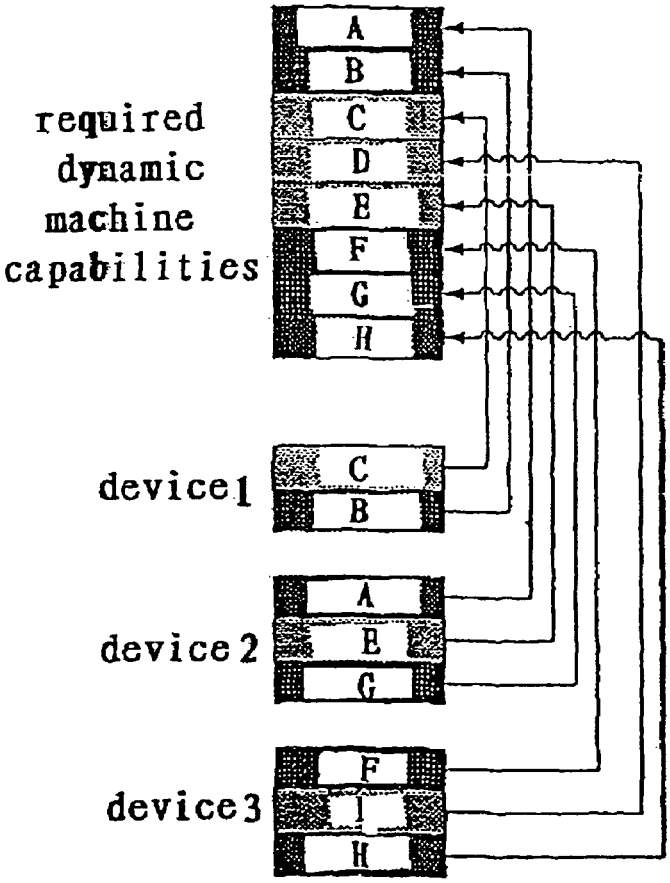
FIGS. 2a and 2b illustrate how components are formulated from devices.
Figure 2B:
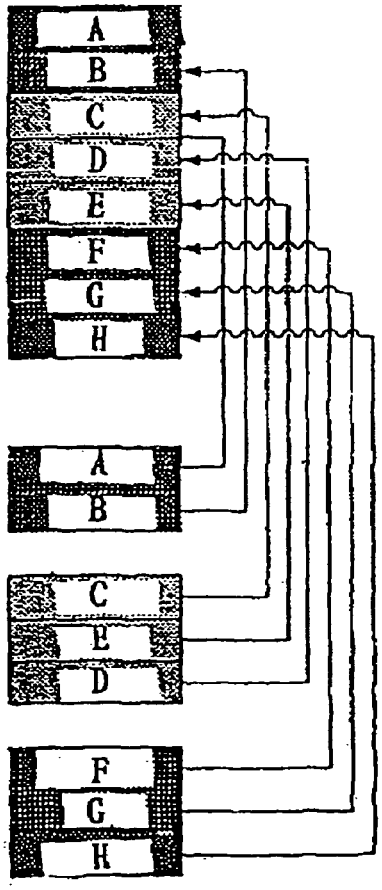

As shown in FIG. 2A, a DM may require some capabilities from A to H. The three devices below happen to have all those required capabilities and thus in runtime they could be linked to proper dummy objects respectively, as shown in FIG. 2A. Of course it is not the only way to link devices to objects. FIG. 2B shows another possible way for device linking.

DDL process is supposed to be conducted by a master device when building a DM. The master device should try to find available and suitable devices around and build logic components as well as the entire DM through DMTP. Linked devices are set to slave-mode and start to operate according to command sent from CPU. A reverse process is started when the DM is no longer needed and all linked devices are unlinked and set to standalone mode.

DDL is an important concept in DMS programming that program logic is not written according to real objects but to dummy ones. It is also a very important step in building a DM, that dummy objects must be linked to real devices before application logic can really start to work.

Dynamic Machine Lifecycle:

Lifecycle represents possible steps for a dynamic machine to come into being, work and disappear as desired.

Concept/Idea step: a DM is supposed to help user solve some kind of problem with ease. So it is necessary to find a problem and conceive a solution to the problem.

Application/Authoring: the actual step to turn the solution into DMTL code based on relative protocols and standards. Static definition on DM and runtime logic should be included in the application code.

Install Application: when a DMS application code is finished, it is necessary to get it installed on certain DMS enabled devices before it can start to work. An application could be pre-installed in device OS or hardware, or as an optional library, plug-in or program.

Triggering: an application needs to be triggered before it starts to work. It could be started manually by a user, or it could be started automatically according to user preferences, device configuration, policy, event, schedule, etc.

DDL: the assembling process that makes use of available devices to construct a DM. Application code may include necessary constructor methods if special actions need to be taken in the building step. If not enough device resource are available, this process fails and following steps would not be taken.

Work/Operation: DM works according to the logic defined in the application, and it should respond to a device event or a user command to complete certain task.

Reverse DDL: the disassembling process is started either automatically according to application logic or manually by a DM user at the time when a DM is no longer needed. All component devices and resources occupied are supposed to be released.

The application may include necessary destruction methods to perform extra actions in the disassembling step.

User Feedback: application may also include certain methods to help direct user experiences, complaints, suggestions and other forms of feedback back to a proper receiver, which may help device manufacturers, application developers or service providers to improve DMS application usability, efficient and performance by repeating the above necessary steps.

The assembling, operation, and disassembling of a dynamic machine will be described below with reference to drawings.

FIG. 1 illustrates the process of the generation of a DMS application (template), which includes discovering problems encountered by a user, performing demand analysis, performing template design, and installation/operation of a template.

In FIG. 1, at step S101, a user determines a problem that cannot be solved by using any single existing device and demands for a solution. Then, at step S102, a requirement analysis is performed to find out required capabilities/components for the solution. In step S103, a system design is performed, which includes defining user's interaction and data exchange among system components and between other devices/machines. In step S104, template programming is performed, which is the actual coding for the solution, including capability requirements and runtime logic, where all these capability requirements and runtime logic can be written into a template and the template can work on all similar sets of devices.

An object-oriented script language DMTL is used for template authoring, which ensures cross-platform compatibility. The standards involved in template programming include: device capability description, device property description, device method description, and event description.

In step S105, the programmed template is installed onto a user device so as to be ready for running.

Figure 3:
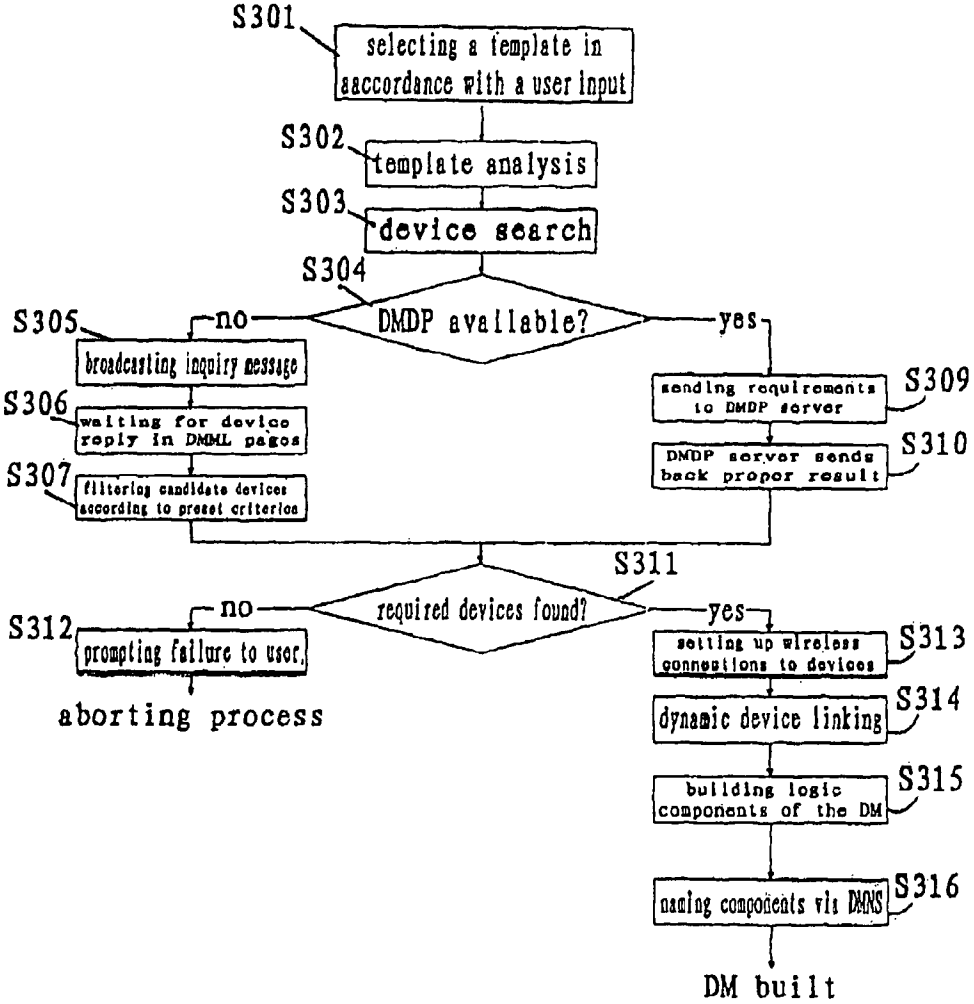
FIG. 3 is an example a flow chart for explaining an assembling process of DM.

FIG. 3 illustrates the process of assembling of a DMS application, including starting a template, i.e. and application, by a user, analyzing the application, searching for required devices, constructing necessary logical functional components, and starting to run. At step S301, using a proper device, a user starts a template. The device must be wireless-communication enabled and have DMTL runtime environment, necessary processing power, and memory. At step S302, the process performs an analysis of the template so as to determine the required capabilities/components and to estimate the required processing power. At step S303, the process searches for required component. At step S304, it is determined whether DMDP is available. If the result of the determination is "NO", the process goes to step S305, where an inquiry message is broadcast, making use of DMTP for protocol-independent data exchange. Then, at step S306, the process wait for devices to reply in DMML pages.

All devices should send back their built-in DMML pages as their reply to an inquiry message upon receiving the inquiry. The DMML pages may involve: device capability description, device property description, device method description, event description, etc.

At step S307, candidate devices are filtered according to predetermined criterions, which include whether a device is the best, whether a device is satisfactory, whether a device is the cheapest, what location a device is in, etc. then, the process goes to step S311.

If the result of determination at step S304 is "YES", i.e. DMDP is available, then the process goes to step S309, where requirements are sent to a DMDP server. The DMDP provides device warehouse services for device management and accelerates device searching. Then, at step S310, DMDP finds proper devices and sends back the result to the user device. Then, the process goes to step S311.

At step S311, it is determined whether required devices are found. If the result of step S311 is "NO", then the process goes to step S312, where the user is prompted of failure, and the process is then aborted. If the required devices are found, the process goes to step S313, where wireless connections to the found devices are set up and where, if devices with various wireless protocol stacks are involved, a gateway may be needed. Then, at step S314, a dynamic device linking is performed.

At step S315, logic components of the DM are built according to template requirements and runtime logic definition, each component may be made up of multiple devices. These devices usually include: CPU, i.e., a device with enough processing power to control the DM operation, which can be the user device that starts the template or can be another device; control panel, which is the human computer interface (HCI) part of the entire DM and is built according to the required HCI capabilities defined in template; main function body, which is the part that accomplishes the main tasks of the DM; and connection point, which is necessary only when the DM needs to connect to other devices/machines.

At step S316, naming of components/devices is performed through DMNS, that is, necessary components/devices in the DM are named with user-friendly names for multi-modal processing. Thus, a DM has been built.

Figure 4:
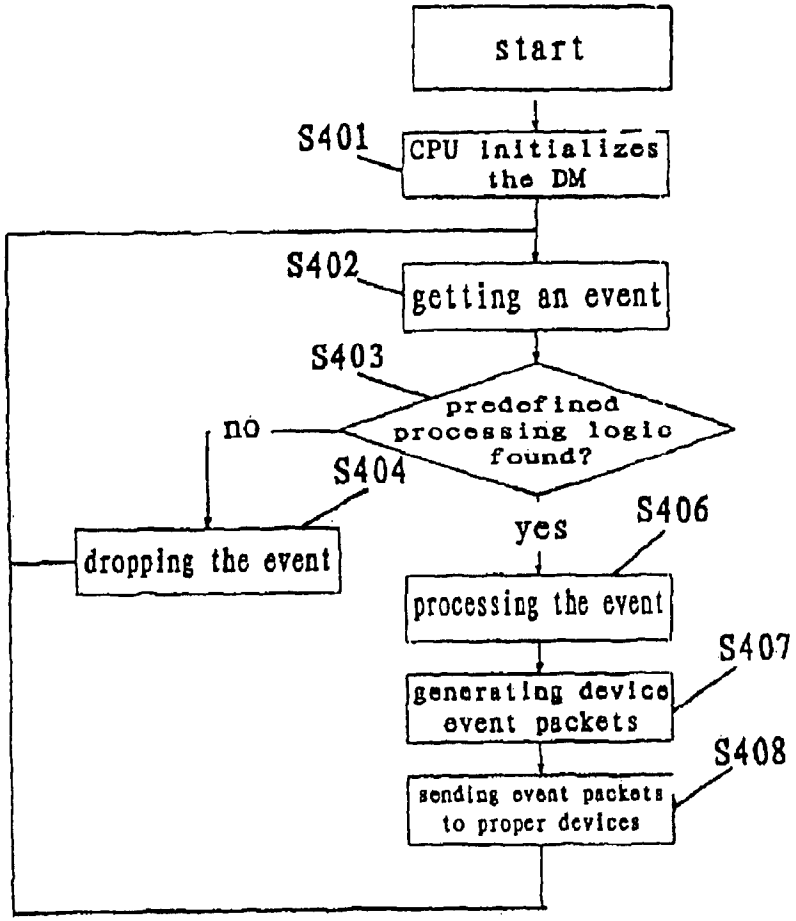
FIG. 4 is an example used for explaining the operation of DM.

FIG. 4 illustrates the operation process of DMS, in which the CPU performs initialization and processes various events generated during operation, i.e., performs operation on relevant devices. As shown in FIG. 4, after DMML starts its work, at step S401, the CPU initializes DM and executes the portal method defined in template to initialize necessary devices and the entire DM by sending proper event packets to component devices.

At step S402, an event is obtained, which can be an event generated by user input, data exchange or device state change and which is sent to CPU.

At step S403, it is determined if a predefined processing logic is found. If the result of step S403 is "NO", then the process goes to step S404, where the event is dropped.

If the predefined processing logic is found at step S403, the process goes to step S406, where the event is processed by using the predefined logic of the template and what actions a component device should carry out is determined.

Then, the process goes to step S407, where the component devices are commanded through events and CPU generates appropriate event packets to proper devices. Here the event description standards are involved.

Then, the process goes to step S408, where CPU sends event packets to proper devices through DMTP.

Figure 5:
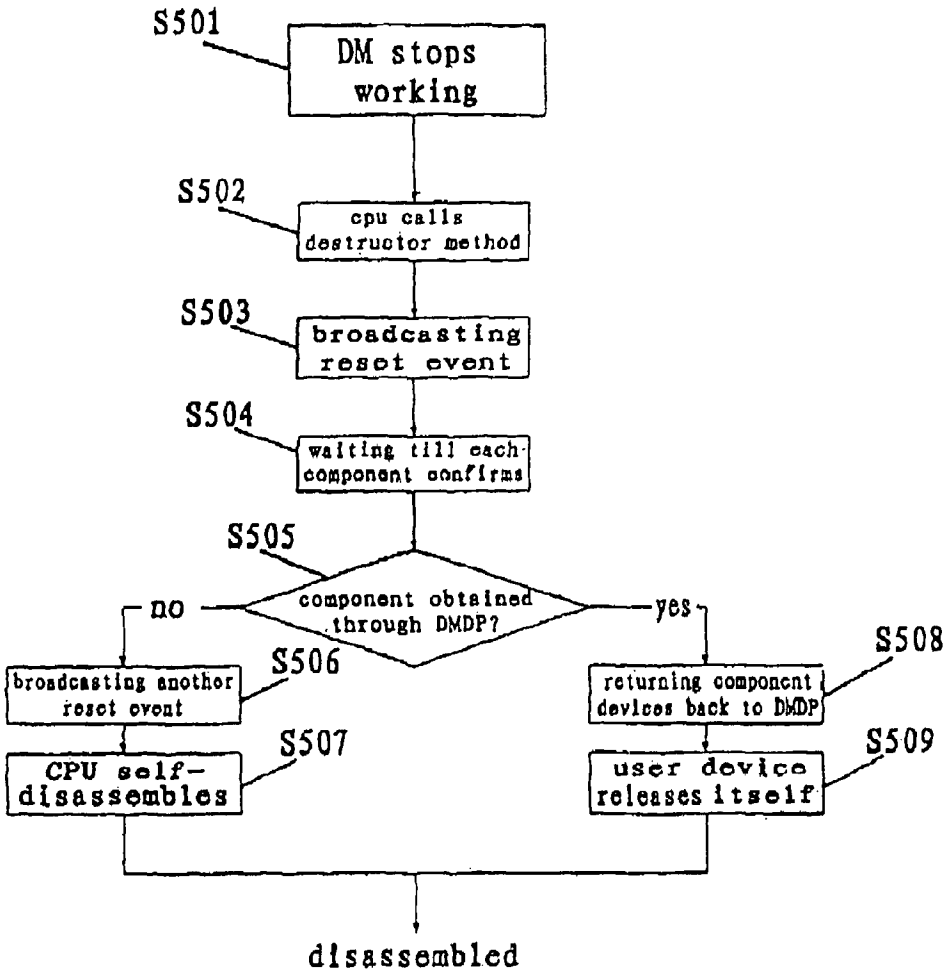
FIG. 5 is an example used for explaining the disassembling of DM.

FIG. 5 illustrates the disassembling process of a DMS, in which the CPU performs the disassembling, broadcasts a reset message and frees devices. As shown in FIG. 5, at step S501, the disassembling process is triggered by a user command or a certain event, and the DM stops working. Then, at step S502, CPU calls a destructor method, including freeing resources, disconnecting from a remote server, etc. then, at step S503, a reset event is broadcast; all component devices should confirm by replying to this event and perform necessary cleaning up; event description standards are involved in this step. At step S504, the process waits till each component confirms.

Then, at step S505, it is determined whether a component is obtained through DMDP. If the result of step S505 is "NO", the process goes to step S506 to broadcast another reset event. Then, at step S507, CPU performs self-disassembling of DMS and frees the components controlled by CPU, thus finishing the disassembling process.

If the result of step S505 is "YES", then, the process goes to step S508, where the component device is returned to DMDP, and DMDP performs necessary cleaning up and resetting. Then, at step S509, the user device frees itself to finish the disassembling process.

Advantages of DMS:

Natural and Consistent Device Access and Management: various devices have various access methods. In the traditional approach, if a device needs to support some kind of access method, it must have appropriate modules physically installed. For example, if a microwave oven is to support voice command, it must have a speech recognition module. Various devices come with various remote-control sets when put together will surely cause lots of confusions and inconveniences. DMS provides a new solution to solve this kind of problems. That is to try to make any access and management capability from any device available to any others through DM building. For example, one device's speech recognition engine could serve other devices to make them appear speech enabled. Or a PDA with a touch screen could display many other devices' control panels, and a user could bring up the desired ones any time to command target devices with that PDA without confusion.

Convenience and Flexibility: people need to do various things when they go around but any single device could not handle all the jobs. We may carry lots of devices all the time, which is not at all convenient. Or we can try to invent some powerful "all-in-one" devices. In reality "all-in-one" is attractive but just not practical, for such devices are hard to build into portable forms and must be updated now and then to meet new requirements, which is by no means flexible. With DMS, powerful DMs can be built in time of need and users need only to carry few powerful master devices. There could be numerous ways to make use of simple devices that we do not need to tailor-make machines for specific applications. DMS would provide people with dynamic machines that may solve even the most complicated problems.

Optimized Resource Distribution: nowadays people are constantly encountering the "80-20" problem, that you probably spend 80% of the time working with only 20% of all the functions. But you have got to pay for the 100%. DMS provides a possible solution to this problem that to make those infrequently used function modules as shared public resources. These resources can join with other devices through DMS to perform complex tasks. Thus users can just RENT infrequently used resources in time of need rather than BUY them and wait for a rare chance to use them.

It is to be understood that the description and illustration of embodiments and modifications here are for the purpose of illustrating the principles of the present invention only, and various modifications can be implemented by one skilled in the art without departing from the scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for constructing a machine using a plurality of devices selected from a group of devices, wherein each device in said group of devices is configurable for providing short-range wireless communication, the method comprising the steps of:

starting an application template in response to an instruction from a user, wherein the application template comprises coding of capability requirements and runtime logic;

analyzing the template to determine one or more capabilities required for the machine;

searching in the group for devices substantially matching at least one of said capabilities;

filtering devices according to predetermined criteria comprising at least one of device rating, device cost and device location; and integrating the filtered devices substantially matching at least one of said capabilities into the machine.

2. The method of claim 1, wherein said template defines the machine formed with one or more components each having required capabilities, and said integrating step comprises:

linking devices from the group with at least one of the required capabilities so as to build each of said one or more components using the linked devices; and integrating said one or more components into said machine.

3. The method of claim 1, characterized by further comprising the steps of determining whether a pool processing device capable of performing a pool processing for said template application exists in said group.

4. The method of claim 3, wherein when it is determined that a pool processing device exists in said group, the pool processing device carries out the searching step and device management.

5. The method of claim 3, wherein when it is determined that no pool processing device exists in said group, said searching step comprises:

broadcasting an inquiry message over the group; and allowing each device in the group to respond to the inquiry message with information associated therewith.

6. The method of claim 5, wherein said information associated with the device comprises at least one built-in page, which describes at least one of capabilities of the device, properties of the device, and events.

7. The method of claim 6, wherein said at least one built-in page includes a detailed profile of the device written in one or more languages common to all the devices in the group and in a readable format.

8. The method of claim 7, wherein said profile includes information selected from an information group consisting of device capability description;

device property description;

device method description; and event description.

9. The method of claim 7, further comprising the step of generating information regarding the machine for higher-level management.

10. The method of claim 5, further comprising the step of selecting devices to be used for building the machine based on the information associated with the device.

11. The method of claim 1, wherein the short-range wireless communication comprises infrared transmission.

12. The method of claim 1, wherein the short-range wireless communication comprises a Bluetooth protocol.

13. A computer program product comprising a computer [usable] *readable non-transitory storage* medium having computer readable program code means embodied therein for causing [means for] construction of a machine using devices selected from a group of devices, the computer readable program code means in said computer program product comprising computer readable program code means for causing a computer to:

start an application template in response to an instruction from a user, wherein the application template comprises coding of capability requirements and runtime logic;

analyze the template to determine one or more capabilities required for the machine;

search in the group of devices for devices matching at least one of the capabilities; and filter devices according to predetermined criteria comprising at least one of device rating, device cost and device location; and integrate the filtered devices matching at least one of the capabilities into the machine.

14. An apparatus for constructing a machine using a plurality of devices selected from a group of devices, wherein each device in the group of devices is configurable for providing short-range wireless communication, the apparatus comprising:

a processor operative to: (i) start an application template in response to an instruction from a user, wherein the application template comprises coding of capability requirements and runtime logic; (ii) analyze the template to determine one or more capabilities required for the machine; (iii) search in the group of devices for devices matching at least one of the capabilities; (iv) filter devices according to predetermined criteria comprising at least one of device rating, device cost and device location; and (v) integrate the filtered devices matching at least one of the capabilities into the machine.

15. An article of manufacture for constructing a machine using a plurality of devices selected from a group of devices, wherein each device in the group of device is configurable for providing short-range wireless communication, the article of manufacture comprising a *non-transitory* machine readable medium containing one or more programs which when executed implement the steps of:

starting an application template in response to an instruction from a user, wherein the application template comprises coding of capability requirements and runtime logic;

analyzing the template to determine the capabilities required for the machine;

searching in the group for devices matching at least one of said capabilities;

filtering devices according to predetermined criteria comprising at least one of device rating, device cost and device location; and integrating the filtered devices searched-out in the searching step into the machine.

16. A *non-transitory* program storage device readable by machine for constructing a dynamic machine using a plurality of devices selected from a group of devices, wherein each device in the group of devices is configurable for providing short-range wireless communication, tangibly embodying a program of instructions executable by the machine which when executed implement the steps of:

starting an application template in response to an instruction from a user, wherein the application template comprises coding of capability requirements and runtime logic;

analyzing the template to determine the capabilities required for the machine;

searching in the group for devices matching at least one of said capabilities;

filtering devices according to predetermined criteria comprising at least one of device rating, device cost and device location; and integrating the filtered devices searched-out in the searching step into the dynamic machine.

*17. A method of assembling an equipment using a plurality of configurable devices capable of being communicatively linked together, comprising:*

*determining a problem that cannot be solved using any single one of the plurality of devices and requires a solution;*

*performing a requirements analysis to find required capabilities/components for the solution;*

*performing a system design which includes defining a device user's interaction and data exchange among system components and between other ones of the plurality of devices;*

*performing template programming including coding of capability requirements and runtime logic written into a template;*

*installing the programmed template onto a user device among the plurality of devices;*

*assembling an equipment application by starting the template;*

*analyzing the template to determine the required capabilities/components and to estimate the required processing power; searching for the required capabilities/components among the plurality of devices; (and)*

*filtering the devices according to predetermined criteria including at least one of device rating, device cost and device location; and*

*constructing necessary logical functional components from found capabilities/components to complete assembly of the equipment.*

*18. A method of assembling an equipment as recited in claim 17 wherein an object-oriented script language is used for the template programming to ensure cross-platform compatibility.*

*19. A method of assembling an equipment as recited in claim 18 wherein standards involved in the template programming include device capability description, device property description, device method description, and/or event description.*

*20. A method of assembling an equipment as recited in claim 19 wherein each of the plurality of devices is wireless-communication enabled and has runtime environment, necessary processing power, and memory.*

*21. A method of assembling an equipment as recited in claim 17 wherein following the search for required capabilities/components, a determination is made whether or not dynamic machine device pool (DMDP) processing is available, and if the result of the determination is "NO", an inquiry message is broadcast to the plurality of devices, making use of dynamic machine transfer protocol (DMTP) for protocol-independent data exchange, and the process then waits for devices to reply in dynamic machine markup language (DMML) pages which may involve at least one of the following; device capability description, device property description, device method description and/or event description.*

*22. A method of assembling an equipment as recited in claim 21 wherein in response to receipt of device replies, pages from the candidate devices are filtered according to predetermined criterions including whether the device is the*

*best, whether the device is satisfactory, whether the device is the cheapest, and/or the location of the device.*

*23. A method of assembling an equipment as recited in claim 22 wherein if the result of the determination is YES, DMDP is available, then the process sends the requirements to a DMDP server which provides device warehousing services for device management and accelerates device searching, and when the server finds appropriate devices, the result is sent back to the user device for determination as to whether or not the required devices have been found; if the result is "NO", the required devices have not been found, then the user is prompted of the failure, and the process is aborted; if the result is "YES", the required devices have been found, connections to the found devices are set up.*

*24. A method of assembling an equipment as recited in claim 23 wherein after the devices are set up, a dynamic device linking is performed and logic components of the equipment are built according to template requirements and runtime logic definition.*

*25. A method of assembling an equipment as recited in claim 24 wherein after the dynamic device linking is performed and logic components of the equipment are built, the components/devices are named with user-friendly names for multi-modal processing.*

*26. A method as recited in claim 17 wherein the equipment is a wireless communication system using a Bluetooth protocol.*

*27. A method of assembling an equipment as recited in claim 26 wherein an object-oriented script language is used for the template programming to ensure cross-platform compatibility.*

*28. A method of assembling an equipment as recited in claim 27 wherein standards involved in the template programming include device capability description, device property description, device method description, and/or event description.*

*29. A method of assembling an equipment as recited in claim 28 wherein each of the plurality of devices is wireless-communication enabled and has runtime environment, necessary processing power, and memory.*

*30. A method as recited in claim 25 wherein the equipment is a wireless communication system using a Bluetooth protocol.*

*31. A method of assembling an equipment as recited in claim 25 wherein an object-oriented script language is used for the template programming to ensure cross-platform compatibility.*

*32. A method of assembling an equipment as recited in claim 31 wherein standards involved in the template programming include device capability description, device property description, device method description, and/or event description.*

*33. A method of assembling an equipment as recited in claim 25 wherein each of the plurality of devices is wireless-communication enabled and has runtime environment, necessary processing power, and memory.*

* * * * *